(12) United States Patent
Choi et al.

(10) Patent No.: US 6,385,146 B1
(45) Date of Patent: May 7, 2002

(54) OPTICAL PICK-UP ACTUATOR USING A CONCENTRATED MAGNETIZATION

(75) Inventors: In Ho Choi, Kyungki-do; Seong Pyo Hong, Seoul, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/223,176

(22) Filed: Dec. 30, 1998

(30) Foreign Application Priority Data

Apr. 7, 1998 (KR) ......................................... 1998-12317

(51) Int. Cl.[7] ............................................... G11B 7/095
(52) U.S. Cl. ..................... 369/44.16; 359/814; 359/824
(58) Field of Search .......................... 369/44.14–44.16; 359/813–814, 823–824

(56) References Cited

U.S. PATENT DOCUMENTS 5,663,840 A * 9/1997 Matsui ................ 369/44.15 X
5,881,033 A * 3/1999 Murakami et al. ....... 369/44.14
5,903,539 A * 5/1999 Tanaka ................ 369/44.15 X

FOREIGN PATENT DOCUMENTS

JP  08-180434  7/1996

OTHER PUBLICATIONS

Patent Abstracts of Japan, for JP9–167365, JP Patent Document Published Jun. 24, 1997.
Patent Abstracts of Japan, for JP 59–221838, JP Patent Document Published Dec. 13, 1984.

* cited by examiner

*Primary Examiner*—W. R. Young
(74) *Attorney, Agent, or Firm*—Fleshner & Kim, LLP

(57) ABSTRACT

An actuator for optical pick-up using the concentrated magnetization method that is capable of moving an objective lens converging a laser light beam onto an optical disc. In the actuator, a lens holder is attached to the objective lens. Coils are wound around the lens holder to receive a current. A permanent magnet constructs a magnetic circuit along with the coils to generate a driving force for the objective lens and is magnetized to concentrate a magnetic flux toward the coils. The actuator can improve a driving sensitivity in a wide frequency band with the aid of the permanent magnet in which a magnetic flux density concentrates on the effective surfaces of the coils.

15 Claims, 5 Drawing Sheets

OPTICAL PICK-UP ACTUATOR USING A CONCENTRATED MAGNETIZATION

BACKGROUND OF THE INVENTION

1. Field of the Invention

This invention relates to an actuator for an optical pick-up using the concentrated magnetization method that is used to drive an objective lens for converging a laser light beam onto an optical disc.

2. Description of the Related Art

Nowadays, there have been suggested various types of optical pick-up for recording and reproducing an information on and from an optical disc in accordance with the fast development of optical disc. Generally, the optical pick-up includes a laser diode used as a light source, an optical system for guiding a laser light beam into an optical disc, an objective lens for converging the laser light beam onto the optical disc in a spot shape and an actuator for moving the objective lens in the focusing direction of optical disc or in the width direction of track. The actuator for optical pick-up allows the light spot to trace tracks in an optical recording medium even though the recording medium occurs a surface vibration, an eccentricity and so on by driving the objective lens around two axes.

As shown in FIG. 1, such an optical pick-up actuator includes an objective lens 2, a lens holder 4, permanent magnets 6, yokes 8, tracking coils 10, a focusing coil 12 and a wire spring 14. The objective lens 2 converges a laser light beam generated at the laser diode onto the information recording surface of the optical disc in a spot shape. The lens holder 4 inserts and secures the objective lens 2 to support the objective lens 2. To this end, the center of the lens holder 4 is provided with a circular hole for securing the objective lens 2. The focusing coil 12 is wound around the circumference surface of the lens holder 4. The tracking coils 10 are attached to the focusing coil 12 to thereby form a closed current loop perpendicular to a current flowing the focusing coil 12. The permanent magnets 6 are arranged one by one at the upper portion and the lower portion of the lens holder 4 in such a manner to be opposite to the tracking coil 10. Each permanent magnet 6 is attached to the yoke 8 made from a magnetic material such as still and the like so as to guide a magnetic flux. The permanent magnets 6, the tracking coils 10 and the focusing coil 12 form a magnetic circuit generating a Lorentz force under the Fleming's left-hand rule. The objective lens 2 is moved in the focusing direction or the tracking direction by means of the Lorentz force generated at the magnetic circuit. The wire spring 14 forms a current path between the tracking coil 10 and the focusing coil 12 and, at the same time, acts as a driving axis of the lens holder 4 when the lens holder 4 is moved in the focusing direction(i.e., upward or downward direction) or the tracking direction(i.e., left or right direction). Also, the wire spring 14 serves to support the lens holder 4 by means of its elastic force.

The optical pick-up actuator generates Lorentz forces by means of the tracking coils 10 and the focusing coil 12 arranged within a magnetic space formed with the permanent magnets 6 and the yokes 8. The objective lens 2 is moved in the upward, downward, left, or right direction along with the lens holder 4 by the Lorentz forces to thereby control a focusing and a tracking. As shown in FIG. 2A, a magnetic circuit for the focusing consists of a focusing coil 12 and a permanent magnet 6 magnetized into N pole or S pole. A magnetic flux generated at the permanent magnet 6 passes through the permanent magnet 6 and the yoke 8 to interlink the focusing coil 12. In this case, the Lorentz force emerges in the vertical direction by a current applied to the focusing coil 12, the horizontal surface of which is perpendicular to the magnetic flux. The objective lens 2 is moved in the vertical direction(i.e., upward or downward direction) along with the lens holder 4 by means of the Lorentz force, thereby controlling a size of the light spot on the optical recording medium. As shown in FIG. 2B, a magnetic circuit for the tracking consists of a permanent magnet 6 magnetized into N and S poles, and tracking coils 10 opposed to the magnetic surface of the permanent magnet 6. In this case, the Lorentz force emerges in the horizontal direction by a current applied to the tracking coil 10, the vertical surface of which is perpendicular to the magnetic flux. The objective lens 2 is moved in the horizontal direction(i.e., left or right direction) along with the lens holder 4 by the Lorentz force, thereby moving a light beam on the optical recording medium in the track direction. The permanent magnet 6 used in such a magnetic circuit is magnetized in such a manner that magnetic flux lines progress in parallel within itself. Since the magnetic flux lines progress in parallel within the permanent magnet 6, as shown in FIG. 3, only magnetic flux lines generated at the center of the permanent magnet 6 are interlinked with the tracking coil 10 or the focusing coil 12. In other words, many magnetic flux lines generated at the upper side and the lower side of the permanent magnet 6 are leaked. This leakage of magnetic flux lines causes a deterioration in the efficiency, that is, the sensitivity of the permanent magnet 6. According to an experimental data in this regard, a magnetic flux density interlinked with the tracking coil or the focusing coil 12 is about 2000 to 3000 Gauss and a sensitivity in a frequency of 200 Hz is about 0.035 to 0.045 mm/V in the focusing direction and about 0.020 to 0.030 mm/V in the tracking direction in the case of the magnetic circuits as shown in FIG. 2A and FIG. 2B.

The optical pick-up actuator is preferable to have a great actuation amount with respect to a small signal because an allowance range in a size of the optical spot converged onto the optical disc becomes smaller as the optical disc has a higher density. Also, the optical pick-up actuator requires a wider servo band and a higher acceleration as a recording/reproducing apparatus has a high-multiple speed. In other words, the optical pick-up actuator is required to have a high sensitivity at a wide band including both the low frequency band and the high frequency band.

The sensitivity of the optical pick-up actuator can have a different value depending upon a magnetic flux density, an effective length of coil, a weight of actuating part and so on. Particularly, since a sensitivity in both the low frequency band and the high frequency band is considerably enhanced when a magnetic flux density of the permanent magnet 6 becomes high, a scheme for improving the permanent magnet has been raised as an important factor for making a high sensitivity of optical pick-up actuator. A high grade of neodymium sintered magnet capable of generating many magnetic flux lines is used as the permanent magnet to satisfy such a high sensitivity characteristic. This neodymium sintered magnet is an expensive material in itself. Furthermore, a higher grade of neodymium sintered magnet causes a higher rise in the material cost. Accordingly, it becomes necessary to enhance the efficiency of permanent magnet and the driving sensitivity in the optical pick-up actuator with a view to keeping up with a trend toward the high density and the high-multiple speed.

SUMMARY OF THE INVENTION

Accordingly, it is an object of the present invention to provide an actuator for optical pick-up using concentrated magnetization method wherein a driving sensitivity is improved in a wide frequency band.

In order to achieve these and other objects of the invention, an actuator for optical pick-up using the concentrated magnetization method according to one aspect of the present invention includes a lens holder attached to an objective lens; a coil wounded around the lens holder to receive a current; and permanent magnet means for constructing a magnetic circuit along with the coil so as to move the objective lens, the magnet means being magnetized in such a manner to concentrate a magnetic flux on the effective surface of the coil.

An actuator for optical pick-up using the concentrated magnetization method according to another aspect of the present invention includes a lens holder attached to an objective lens; a tracking coil wounded around the lens holder; a focusing coil adhered to the tracking coil to receive a current in a direction perpendicular to a direction of a current applied to the tracking coil; permanent magnet means for constructing a magnetic circuit along with the coils, the magnet means being magnetized in such a manner to concentrate a magnetic flux on the effective surfaces of the tracking coil and the focusing coil; a yoke for guiding a magnetic flux generated at the permanent magnet means into the tracking coil and the focusing coil; a frame for supporting the yoke and the permanent magnet means; and an elastic member for delivering currents applied to the tracking coil and the focusing coil and for stabbly supporting the lens holder upon movement of the objective lens.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
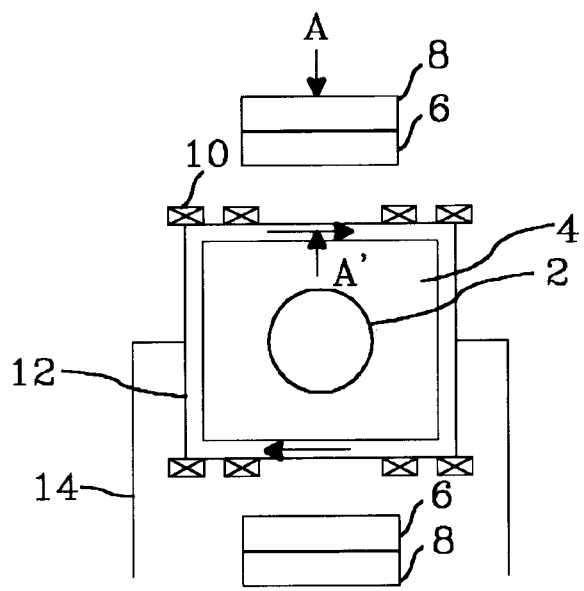
FIG. 1 is a schematic plan view showing the structure of a conventional optical pick-up actuator.
Figure 2A:
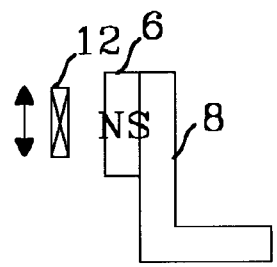
FIG. 2A schematically illustrates a focusing magnetic circuit included in the actuator shown in FIG. 1.
Figure 2B:
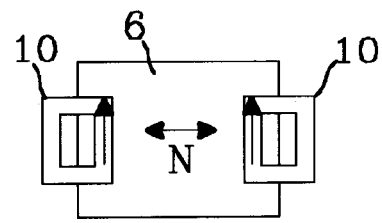
FIG. 2B schematically illustrates a tracking magnetic circuit included in the actuator shown in FIG. 1.
Figure 3:
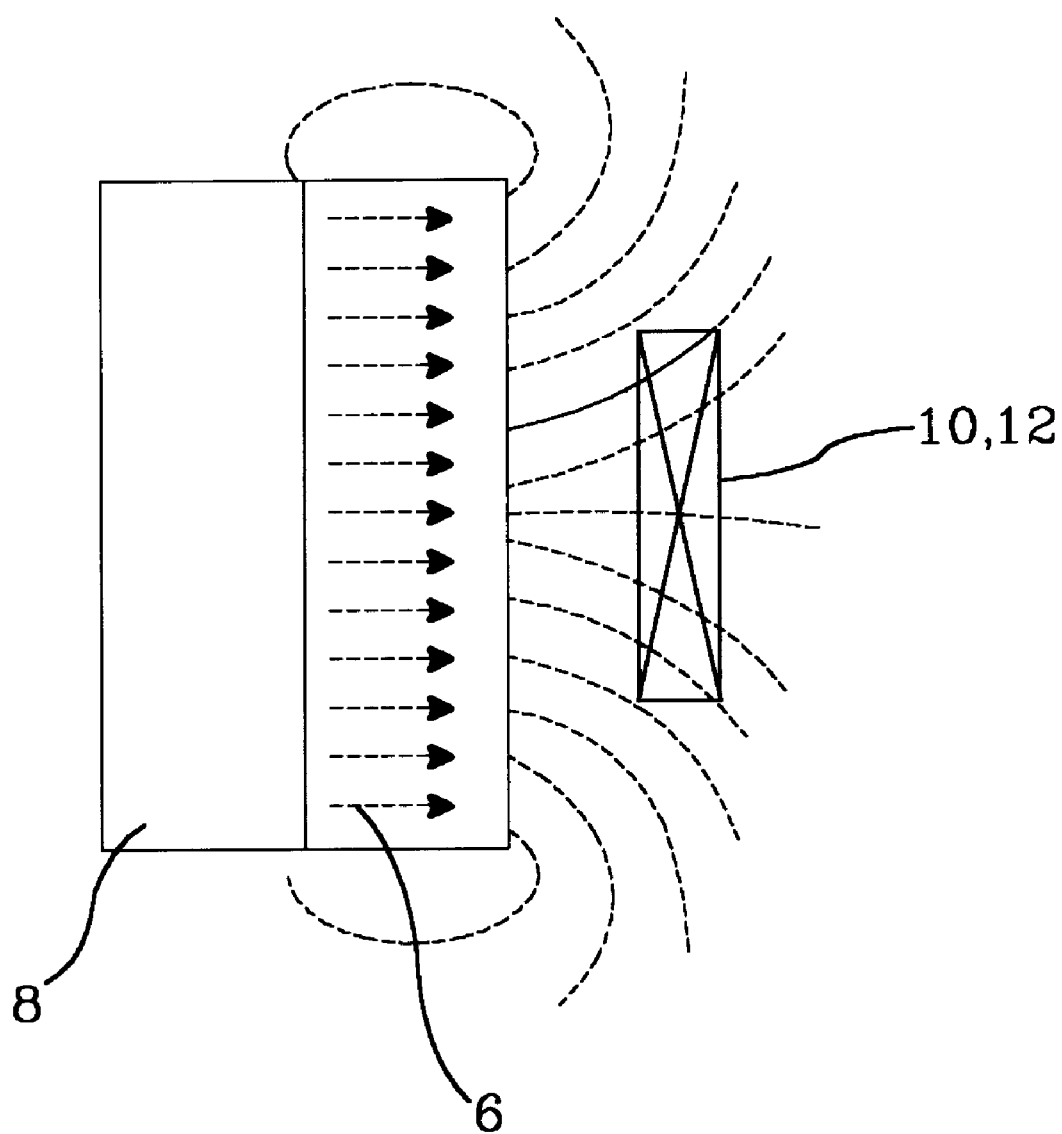
FIG. 3 represents a magnetized direction in the permanent magnet shown in FIG. 1.
Figure 4:
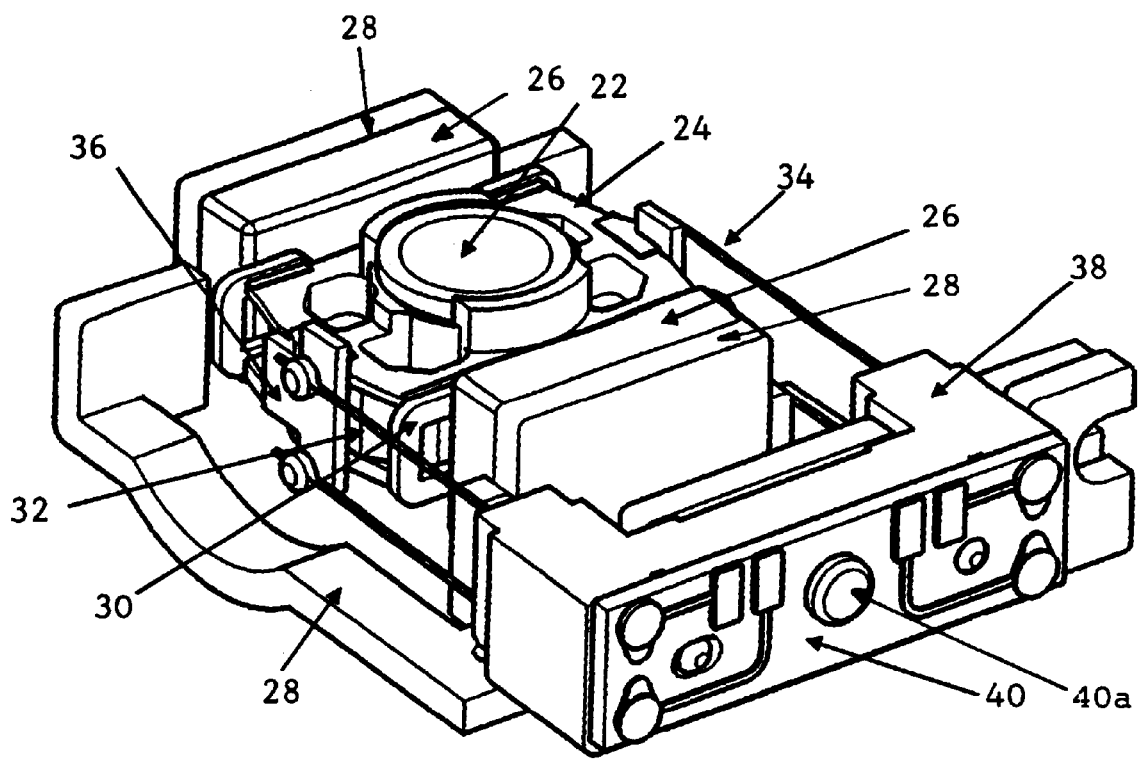
FIG. 4 is a schematic perspective view showing an actuator for optical pick-up using the concentrated magnetization method according to an embodiment of the present invention.

Referring to FIG. 4, there is shown an actuator for optical pick-up using the concentrated magnetization method according to an embodiment of the present invention. The actuator includes an actuating part consisting of an objective lens 22, a lens holder 24, a tracking coil 30, a focusing coil 32, a bobbin printed circuit board(PCB) 36 and a wire spring 34. The objective lens 24, the tracking coil 30 and the focusing coil 32 has the same structure and function as those in the conventional optical pick-up actuator shown in FIG. 1. Accordingly, the object lens 22 is secured to the lens holder 24, and the focusing coil 32 is wound around the circumference of the lens holder 24. The tracking coil 30 is attached to the focusing coil 32. The one end of the wire spring 5 is connected to the bobbin PCB 36 which is secured to the circumference side wall of the lens holder 24. The bobbin PCB 36 and the wire spring 34 form a current path to supply a current to the tracking coil 30 and the focusing coil 32. Also, the wire spring 34 connects the actuating part to a stationary part and acts as a spring upon driving of the actuating part.

Figure 5:
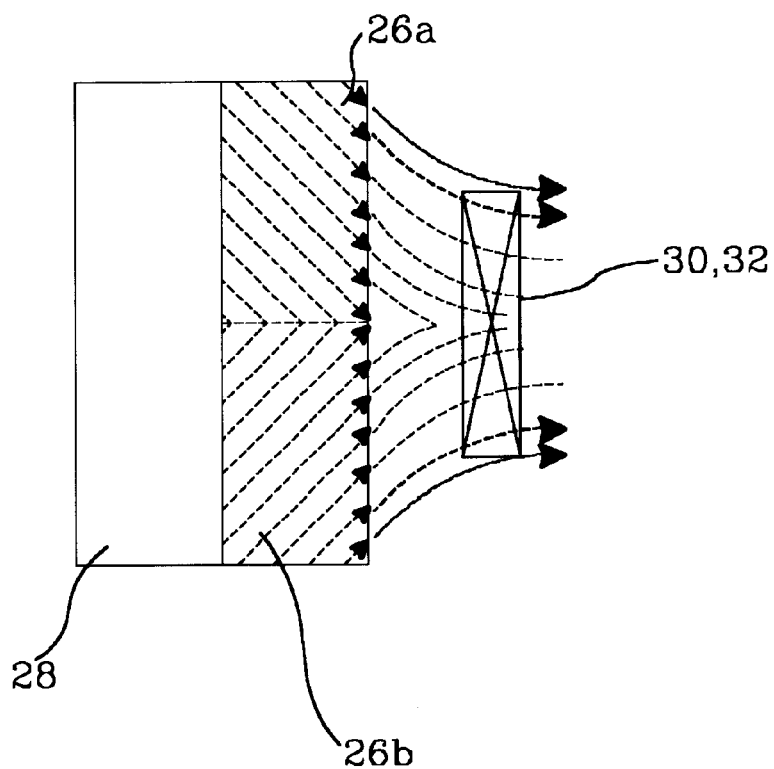
FIG. 5 represents a magnetized direction in the permanent magnet shown in FIG. 4.
Figure 7:
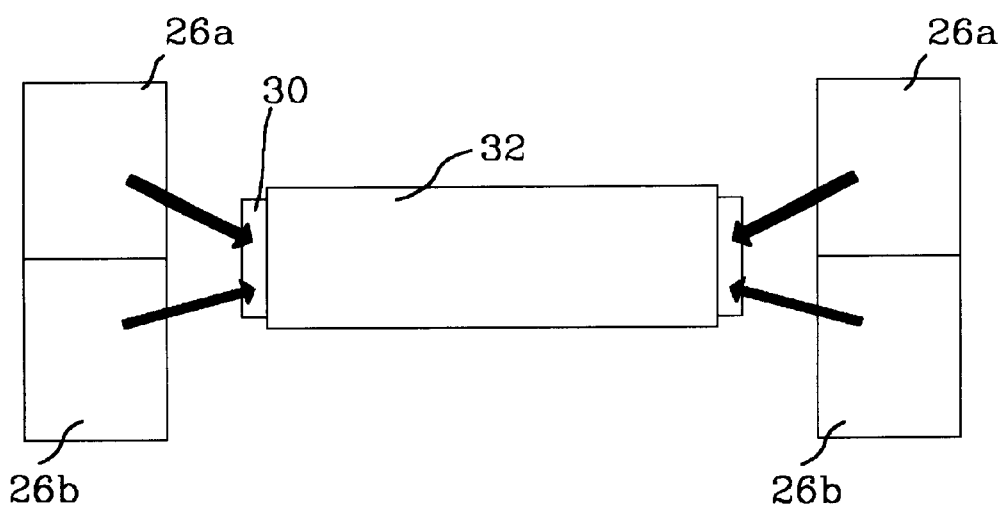
FIG. 7 is a side view of the tracking magnetic circuit taken in the "B"direction of FIG. 6A.
Figure 6A:
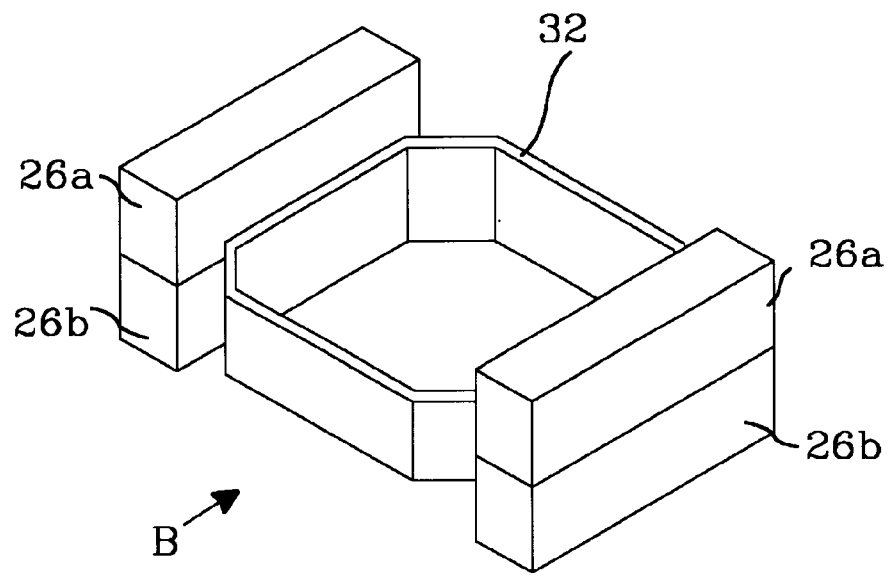
FIG. 6A is a detailed view of a tracking magnetic circuit included in the actuator shown in FIG. 4.
Figure 6B:
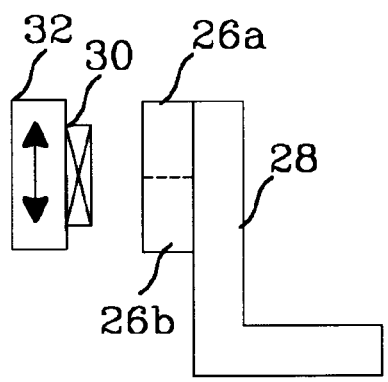
FIG. 6B is a detailed view of a focusing magnetic circuit included in the actuator shown in FIG. 4.

The actuator further includes a stationary part consisting of permanent magnets 26, yokes 28, a frame 38 and a frame PCB 40. As shown in FIG. 5, the permanent magnets 26 is magnetized into a anisotropic(or heterogeneous direction) system formed in a direction of concentrating on the effective surfaces of the tracking coil 30 and the focusing coil 32. Herein, dotted lines represent magnetic flux lines. To this end, as shown in FIG. 5, the permanent magnet 26 is made by adhering an upper-piece magnet 26a and a lower-piece magnet 26b having a different magnetizing direction to each other in such a manner that a magnetic flux density concentrates on the effective surface of the tracking coil 30 and the focusing coil 32. Since a density of the magnetic flux generated at the permanent magnet 26 concentrates on the effective surfaces of the tracking coil 30 and the focusing coil 32 by this magnetization method, an efficiency of the permanent magnet 26 and a driving sensitivity in the actuator can be maximized. The permanent magnet 26 is attached to the yoke 28 in such a manner to be opposite to the tracking coil 30 and the focusing coil 32. The yoke 28 is responsible for guiding a magnetic flux in such a manner that a magnetic flux generated at the permanent magnet 26 directs toward the tracking coil 30 and the focusing coil 38. The yoke 28 is secured to the frame 38 which is connected to the one end of the spring 34. To the rear surface of the frame 38 secured the frame PCB 40 to which a servo signal is applied from a servo signal supply source(not shown) by means of a screw 40a. The actuating part is driven in the focusing direction or the tracking direction with Lorentz forces generated at magnetic circuits as shown in FIG. 6A and FIG. 6B. As shown in FIG. 6A, the magnetic circuit for a driving in the focusing direction consists of the focusing coil 32 and the permanent magnet 26 to drive the actuating part in the focusing direction(i.e., upward direction or downward direction). As shown in FIG. 6B, the magnetic circuit for a driving in the tracking direction consists of the tracking coil 30 and the permanent magnet 26 to drive the actuating part in the tracking direction(i.e., left or right direction).

Referring to FIG. 6A and FIG. 6B, the permanent magnet 26 is made by adhering an upper-piece magnet 26a to a lower-piece magnet 26B. The upper-piece magnet 26 and the lower-piece magnet 26B are formed from a neodymium sintered magnet. The upper-piece magnet 26 and the lower-piece magnet 26B are magnetized in a anisotropic(or heterogeneous) direction arranged in the parallel direction in the prior art. On the other hand, according to the present invention, the anisotropic direction in each of the upper-piece magnet 26a and the lower-piece magnet 26B has a symmetrical slope with respect to each other, so that a magnetic flux density concentrates on the center thereof to thereby concentrate on the effective surfaces of the coils. Accordingly, the anisotropic direction in the upper-piece magnet 26a and the lower-piece magnet 26b is inclined in an apposite direction with respect to each other. In this state, each of the upper-piece magnet 26a and the lower-piece magnet 26b is grounded into a square shape to be adaptive for adhering them. In other words, the upper-piece magnet 26a and the lower-piece magnet 26b each are ground into a square shape when the permanent magnet magnetized in the conventional anisotropic direction has an angle concentrating toward the effective surfaces of the tracking coil 30 and the focusing coil 32. If a magnetization of the upper-piece magnet 26a and the lower-piece magnet 26b is provided in the anisotropic direction, then a magnetizing direction of the permanent magnet is defined in accordance with the anisotropic direction, so that the permanent magnet is magnetized in such a manner that a magnetic flux density concentrates on the effective surfaces of the tracking coil 30 and the focusing coil 32. For example, according to an experimental data, when a magnetizing direction is constructed to concentrate on the effective surfaces of the coils by making the anisotropic direction of the permanent magnet 30 at an angle of 30°, a magnetic flux density interlinked with the tracking coil 30 or the focusing coil 32 becomes about 3000 to 4000 Gauss, and a sensitivity in a high frequency of 200 Hz becomes 0.05 to 0.06 mm/V in the focusing direction and 0.03 to 0.04 mm/V in the tracking direction to show a sensitivity increase of about 30%.

As described above, in the actuator for optical pick-up using the concentrated magnetization method according to the present invention, a magnetization direction of the permanent magnet concentrates on the effective surfaces of the coils, so that an efficiency of the permanent magnet can be enhanced and a driving sensitivity can be considerably improved at the wide frequency band. Also, the actuator according to the present invention permits a use of a low grade of magnet to reduce a material cost.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. For example, the embodiment of the present invention has been implemented such that it allows a magnetizing direction to direct toward the coils by concentrating a direction of the magnetic flux density on the effective surfaces of the coils employing an anisotropic magnet, but the present invention may be implemented in the same manner employing an isotropic magnet. Accordingly, the scope of the invention shall be determined only by the appended claims and their equivalents.

What is claimed is:

1. An actuator for optical pick-up using a concentrated magnetization method, comprising:
   a lens holder attached to an objective lens;
   a coil wound around the lens holder to receive a current; and
   permanent magnet means for constructing a magnetic circuit along with the coil so as to move the objective lens, the magnet means being magnetized in such a manner to concentrate a magnetic flux on the effective surface of the coil, wherein the permanent magnet means includes:
   an upper-piece magnet having its anisotropic direction inclined downwards; and
   lower-piece magnet adhered to the upper-piece magnet in such a manner to have its anisotropic direction inclined upwards.

2. The actuator as claimed in claim 1, wherein the coil includes:
   a focusing coil wound around the circumference of the lens holder to move the objective lens in the upward and downward direction; and
   a tracking coil attached to the circumference surface of the focusing coil to move the objective lens in the left and right direction, the tracking coil being opposed to the permanent magnet means.

3. The actuator as claimed in claim 1, wherein the permanent magnet means is magnetized in a state of orienting its anisotropic direction toward the coil in such a manner that a magnetic flux concentrates on the effective surface of the coil.

4. The actuator as claimed in claim 1, wherein the upper-piece magnet and the lower-piece magnet are made from a sintered magnet.

5. The actuator as claimed in claim 1, wherein the upper-piece magnet and the lower-piece magnet are adhered to each other in such a manner that their anisotropic directions each concentrate on the effective surface of the coil and then are grounded into a square shape.

6. An actuator for optical pick-up using a concentrated magnetization method, comprising:
   a lens holder attached to an objective lens;
   a focusing coil wounded around the lens holder;
   a tracking coil adhered to the focusing coil to receive a current in a direction perpendicular to a direction of a current applied to the focusing coil;
   permanent magnet means for constructing a magnetic circuit along with the coils, the magnet means being magnetized in such a manner to concentrate a magnetic flux on the effective surfaces of the tracking coil and the focusing coil;
   yoke for guiding a magnetic flux generated at the permanent magnet means into the tracking coil and the focusing coil;
   a frame for supporting the yoke and the permanent magnet means; and
   an elastic member for delivering currents applied to the tracking coil and the focusing coil and for stably supporting the lens holder upon movement of the objective lens, wherein the permanent magnet means includes:
   an upper-piece magnet having its anisotropic direction inclined downwards; and
   a lower-piece magnet adhered to the upper-piece magnet in such a manner to have its anisotropic direction inclined upwards.

7. The actuator as claimed in claim 6, further comprising:
   a bobbin circuit board being electrically connected to the tracking coil, the focusing coil and the elastic member and secured to the lens holder to apply a current from the elastic member to the tracking coil and the focusing coil; and
   a frame circuit board being secured to the frame and electrically connected to the elastic member to receive a servo signal from the exterior.

8. The actuator as claimed in claim 6, wherein the permanent magnet means is magnetized in a state of orienting its anisotropic direction toward the coil in such a manner that a magnetic flux concentrates on the effective surface of the coil.

9. The actuator as claimed in claim 6, wherein the upper-piece magnet and the lower-piece magnet are made from a sintered magnet.

10. The actuator as claimed in claim 6, wherein the upper-piece magnet and the lower-piece magnet are adhered to each other in such a manner that their anisotropic directions each concentrate on the effective surface of the coil and then are grounded into a square shape.

11. An optical pick-up actuator, comprising:

a lens holder attached to an objective lens;

a coil wounded around the lens holder to receive a current; and permanent magnet means for constructing a magnetic circuit along the coil so as to move the objective lens, the permanent magnet means comprising a plurality of anisotropic magnets wherein the permanent magnet means includes:

an upper-piece magnet having its anisotropic direction inclined downwards; and a lower-piece magnet adhered to the upper-piece magnet in such a manner to have its anisotropic direction inclined upwards.

12. The actuator as claimed in claim 11, wherein the coil includes:

a focusing coil wound around the circumference of the lens holder to move the objective lens in the upward and downward direction; and a tracking coil attached to the circumference surface of the focusing coil to move the objective lens in the left and right direction, the tracking coil being opposed to the permanent magnet means.

13. The actuator as claimed in claim 11, wherein the permanent magnet means is magnetized in a state of orienting its anisotropic direction toward the coil in such a manner that a magnetic flux concentrates on the effective surface of the coil.

14. The actuator as claimed in claim 11, wherein the upper-piece magnet and the lower-piece magnet are made from a sintered magnet.

15. The actuator as claimed in claim 11, wherein the upper- piece magnet and the lower-piece magnet are adhered to each other in such a manner that their anisotropic directions each concentrate on the effective surface of the coil and then ate grounded into a square shape.

\* \* \* \* \*